(12) United States Patent
Zeuschner et al.

(10) Patent No.: US 10,349,620 B2
(45) Date of Patent: Jul. 16, 2019

(54) METHOD FOR FORMING AND COOLING AN INITIALLY HOT AND THEREFORE FLOWABLE MELTED CHEESE

(71) Applicant: HOCHLAND SE, Heimenkirch (DE)

(72) Inventors: Roland Zeuschner, Argenbuehl (DE); Walter Hartmann, Heimenkirch (DE); Franz Stadelmann, Opfenbach (DE)

(73) Assignee: Hochland SE, Heimenkirch (DE)

( * ) Notice: Subject to any disclaimer, the term of this patent is extended or adjusted under 35 U.S.C. 154(b) by 193 days.

(21) Appl. No.: 15/363,179

(22) Filed: Nov. 29, 2016

(65) Prior Publication Data

US 2017/0202172 A1    Jul. 20, 2017

Related U.S. Application Data

(62) Division of application No. 14/123,241, filed as application No. PCT/EP2012/059701 on May 24, 2012, now Pat. No. 9,510,620.

(30) Foreign Application Priority Data

Jun. 1, 2011   (DE) .................. 10 2011 103 826

(51) Int. Cl.
   *A01J 25/12*     (2006.01)
   *B29C 48/88*     (2019.01)
   *A01J 25/00*     (2006.01)
   *A23C 19/09*     (2006.01)
   *A23P 30/10*     (2016.01)
   (Continued)

(52) U.S. Cl.
   CPC ............. *A01J 25/12* (2013.01); *A01J 25/002* (2013.01); *A23C 19/09* (2013.01); *A23P 30/10* (2016.08); *B29C 48/05* (2019.02); *B29C 48/06* (2019.02); *B29C 48/9145* (2019.02); *B29C 48/906* (2019.02); *B29C 48/914* (2019.02)

(58) Field of Classification Search
   CPC combination set(s) only.
   See application file for complete search history.

(56) References Cited

U.S. PATENT DOCUMENTS

| 5,573,805    | A  | * | 11/1996 | Fager ..................... | A01J 25/00 |
|              |    |   |         |                            | 426/512    |
| 2002/0027309 | A1 | * | 3/2002  | Fujii .................... | B29C 47/0021 |
|              |    |   |         |                            | 264/210.2  |
| 2007/0098861 | A1 | * | 5/2007  | Biggel ................... | A01J 25/12 |
|              |    |   |         |                            | 426/512    |

* cited by examiner

*Primary Examiner* — Michele L Jacobson
*Assistant Examiner* — Preston Smith
(74) *Attorney, Agent, or Firm* — Robert Lelkes

(57) ABSTRACT

A device for forming and cooling an initially hot and therefore flowable melted cheese having (a) a first metallic cooling belt capable of moving in a downstream direction; (b) a counter-pressure roller proximal to the first metallic cooling belt; and (c) a rotatable shaping roller disposed proximal to the first metallic cooling belt downstream of the supply nozzle and upstream from the counter-pressure roller, wherein the rotatable shaping roller has a number of molding cavities formed in the surface, which are separated from one another by separating webs, wherein the separating webs are formed by the remaining surface of the rotatable shaping roller, wherein the rotatable shaping roller is capable of applying a pressure by way of the separating webs onto the cooling belt that results in displacement of the still-hot melted cheese from a region of the separating webs lying thereon, so that shaped bodies of melted cheese released from the molding cavities remain on the first metallic cooling belt for cooling.

14 Claims, 2 Drawing Sheets

(51) Int. Cl.
  *B29C 48/05* (2019.01)
  *B29C 48/06* (2019.01)
  B29C 48/90 (2019.01)

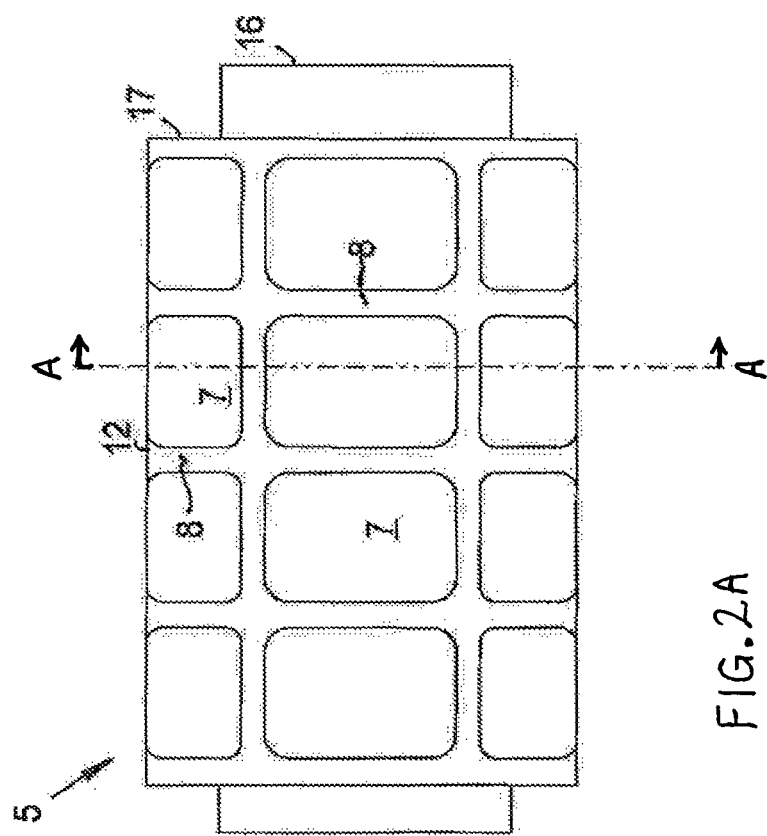

METHOD FOR FORMING AND COOLING AN INITIALLY HOT AND THEREFORE FLOWABLE MELTED CHEESE

CROSS-REFERENCE TO RELATED APPLICATIONS

This application is a divisional of U.S. patent application Ser. No. 14/123,241, now U.S. Pat. No. 9,510,620, which is a national phase under 35 USC § 371 of international patent application no. PCT/EP2012/059701 filed on May 24, 2012.

BACKGROUND OF THE INVENTION

Field of the Invention

The invention relates to a method for forming and cooling an initially hot and therefore flowable melted cheese.

Description of Related Art

The production of processed cheese, more particularly in slice form, is the subject matter of several devices. Typically a mass of processed cheese is initially formed into a type of processed-cheese band. The thermal requirements in particular pose a great challenge in the forming and further processing of the processed cheese since the processed cheese must initially have a certain high temperature in order to be moldable. During the further processing, relatively rapid cooling must then be carried out in order for the processed cheese to retain its shape.

DE 10 2008 061 330 A1 discloses a method for cutting a cheese mass into pieces of a specifiable length. A cheese band is fed by way of a conveyor belt to a cutting device. Next, the cheese band is cut into longitudinal strips. The longitudinal strips are subsequently cut into pieces using a transverse-cutting means. Although processed-cheese slices can be produced in a robust process in this manner, irregularly shaped processed-cheese slices cannot be produced without waste.

WO 2007/122311 shows a method for producing processed-cheese slices. According thereto, a processed-cheese mass is applied directly onto a shaping roller, wherein the processed-cheese mass fills molding recesses on the shaping roller. Concurrently therewith, the shaping roller rotates and feeds the slice-shaped cheese portions disposed in the molding recesses to a conveyor unit for further processing. Cooling means are disposed coaxially around the shaping roller, each of which faces only one surface side of the cheese slices. The arrangement shown for implementing the method has deficiencies with respect to the reliable filling of the molding recess, however. The rotational motion during the cooling process also disadvantageously affects the shaping. Furthermore, the calibration of the thermal conditions within the device is problematic since the cooling means are spaced apart from the cheese slices. Overall, a non-uniform surface appearance can result. Due to the relatively short cooling length on the shaping roller, the shaping roller must move slowly. A low production rate results.

Proceeding therefrom, the problem addressed by the present invention is that of providing an improved method or an improved device for forming and cooling an initially hot and therefore flowable melted cheese. The deficiencies that were addressed should be eliminated if possible.

SUMMARY OF THE INVENTION

The problem addressed by the invention is solved by way of a method for forming and cooling an initially hot and therefore flowable melted cheese, which is applied via a supply nozzle onto a moving metallic cooling belt, wherein individual shaped bodies are formed out of the melted cheese in that a shaping roller, which comprises molding cavities located in the surface, impinges upon the cooling belt. During forming, the shaping roller is applied against the cooling belt with a defined pressure, thereby inducing full displacement of the still-hot melted cheese from the region of the separating webs delimiting the individual molding cavities and bearing against the cooling belt. The shaped bodies are then released from the molding cavities and are cooled by remaining on the moving cooling belt. The cooling belt preferably moves initially approximately vertically downward.

BRIEF DESCRIPTION OF THE SEVERAL VIEWS OF THE DRAWINGS

The invention is explained in greater detail in the following with reference to the figures. Shown are:

FIG. 2A: A detailed side view of shaping roller 5 of the device according to FIG. 1;

FIG. 2B: Cross-sectional view along section A-A of shaping roller 5 of FIG. 2A.

DETAILED DESCRIPTION OF THE INVENTION

Figure 1:
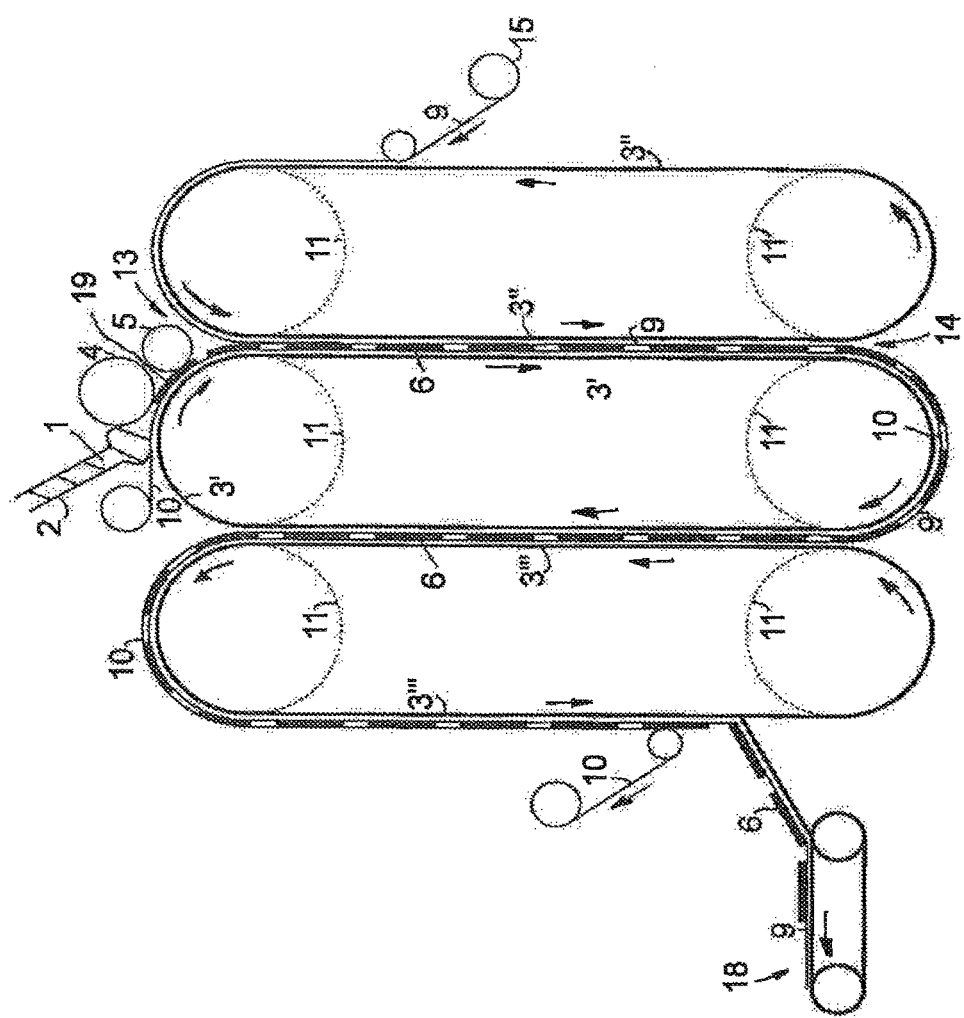
FIG. 1: A schematic side view of the device according to the invention.

According to a significant fundamental idea of the invention, the shaped bodies are formed in the flowable state quasi by being punched out under relatively high pressure of the shaping elements, namely the cooling belt and the shaping roller. The high pressure also results in the full displacement of the melted cheese in the region of the separating webs. By way of the high pressure it can be ensured that the molding cavities are filled completely, thereby making it possible to obtain a plurality of possible shapes and to even form undercuts. The excess cheese material is displaced by the separating webs. It is particularly advantageous when the displaced, flowable cheese material is located relatively close to the available supply of flowable melted cheese. The displaced material can therefore be captured and easily returned to the flowable melted cheese. As a result, no flowable melted cheese is lost. A further fundamental idea relates more particularly to the very good controllability and calibratability of the cooling of the melted cheese during shaping and immediately after shaping since the melted cheese is placed on the moving cooling belt, at least indirectly. Process safety can be increased by way of the at least indirect placement, which preferably ensures that cooled material (except for air) is applied directly. Films are suitable in particular as means for the indirect connection between the cooling belt and the melted cheese or the shaped bodies, more particularly films that can also be used later to separate individual cheese slices, more particularly an interlayer film.

The shaped bodies lying on the cooling belt are preferably covered by a further, second cooling belt moving at the same speed. The second cooling belt, which, more particularly, does not cover the shaped bodies until the shaped bodies are removed from the shaping roller, can bring about improved, controlled cooling since the cooling power can be applied onto the shaped bodies uniformly, more particularly from two sides. This is advantageous more particularly with respect to complexly-formed shaped bodies since different regions can result due to possible different thicknesses of the shaped body, more particularly regions having increased thickness, which require more cooling. Furthermore, an improved surface quality of the shaped bodies can result.

Preferably the shaped bodies will lie on one of the cooling belts on an interlayer film comprising plastic in particular, wherein, after cooling, the product strand formed of the interlayer film and the shaped bodies is oriented such that the shaped bodies lie on the interlayer film and are fed in this orientation to the further processing, wherein the formed bodies lying thereupon are separated in the further processing by cutting the interlayer films. The interlayer film can also be supplied, more particularly, in the form of a plurality of film strips arranged in parallel, wherein the individual film strips then have a width corresponding to the shaped bodies. The separate longitudinal cutting of the interlayer film can then be omitted.

The use of interlayer films between the cooling belt and the shaped bodies can have a number of advantages. For example, the interlayer film can be placed between the melted-cheese mass and the cooling belts already during the process of manufacturing the shaped bodies, preferably even before the shaped bodies are formed. In that case, the interlayer film can be, more particularly, a type of workpiece carrier for the individual shaped body, on which the shaped body remains permanently positioned during the further processing. More particularly, the usually low friction of the interlayer film on a metallic surface is characterized as particularly advantageous since a repositioning of a workpiece, including the workpiece carrier (interlayer film), onto other conveyor belts or the like can be carried out in a simplified manner. At the same time, the surface of the shaped body remains largely spared from mechanical actions. More particularly, when the shaped body is covered by a film on both sides during the cooling process, one of the two films can be the aforementioned interlayer film, while only a type of auxiliary film is used on the other side, which can be removed from the shaped body upon exiting the cooling device, for example. The interlayer film, however, can remain on the shaped body all the way to the end user.

The invention further relates to a device for forming and cooling an initially hot and therefore flowable melted cheese, comprising a supply nozzle for applying the processed cheese onto a moving metallic cooling belt having a shaping roller disposed downstream of the supply nozzle in the direction of motion. The shaping roller impinges upon the cooling belt at a point at which said cooling belt bears against a counterpressure roller, wherein the shaping roller comprises a number of molding cavities formed in the surface, which are separated from one another, more particularly entirely or partially, by separating webs. The separating webs are formed, more particularly, by the remaining surface of the shaping roller, wherein the shaping roller can apply a pressure by way of the separating webs onto the cooling belt that results in the full displacement of the still-hot melted cheese from the region of the separating webs lying thereupon. The shaped bodies made of the melted cheese that are released from the molding cavities remain on the moving cooling belt for cooling. It can also be possible for only indirect contact to be provided between the shaped body and the cooling belt. This results in the advantages mentioned above with respect to the method, and further potential embodiments. Preferably a further, second cooling belt is provided that is moved at the same speed as the first cooling belt and covers the shaped bodies lying on the first cooling belt.

Cooling belts are preferably designed as endless belts, which are made of steel in particular, each of which runs over two deflection rollers, wherein the cooling belts are arranged vertically and form an inlet gap at the top and an outlet gap at the bottom. The shaping roller for forming the shaped bodies is preferably disposed in the region of the inlet gap. At the outlet gap, the two cooling belts separate and can release the shaped body at least briefly and on one side, provided the shaped bodies are not covered by films on two sides. The vertical orientation of the cooling belts can have the known advantages, namely that the shaped body can be substantially decoupled from its own weight during cooling. The cooling belts can bear uniformly against the shaped body and apply uniform cooling to the shaped body. A vertical arrangement of the shaped bodies, which have already separated, can definitely create problems since they are no longer suspended vertically onto a long cheese band.

For shaped bodies that have already been separated in the molten state, if vertical cooling belts are used in particular, these shaped bodies, which are still in the molten state, can lose their shape due to flowing. This is the case more particularly when the shaped bodies have a relatively large thickness of more than 3 mm in particular. This effect can be counteracted by driving the cooling belts slowly, and therefore vertical cooling belts can also be used for shaped bodies separated in the molten state.

Preferably a device for feeding an interlayer film into the inlet gap is provided such that the shaped bodies lie on one of the cooling belts by way of the interlayer film comprising plastic in particular.

Preferably a calibration roller is also provided, which is disposed, in the direction of motion, downstream of the supply nozzle and upstream of the shaping roller. The calibration roller brings about a rolling-out of the hot melted cheese into a cheese band having a specifiable thickness. By way of the calibration roller, a type of cheese band is substantially produced at first, which is then punched out in the subsequent step using the shaping roller. It can thereby be ensured that a cheese band having a thickness that has been specified in a defined manner is fed to the shaping roller. Process safety can be improved as a result, wherein, at the same time, an unnecessary loss of "too much" of processed-cheese mass made available to the shaping roller can be prevented. Furthermore, the weight accuracy of the individual shaped bodies can be improved.

The surface of the shaping roller equipped with molding cavities is preferably made of a plastic, more particularly of Teflon. The shaping roller can be mainly a steel roller, more particularly a stainless steel roller, which is equipped with the plastic coating, more particularly a Teflon coating. In addition to Teflon, other coatings that permit easy removability of the melted cheese are also advantageous.

The shaping roller is preferably formed by a core roller and a hollow roller detachably placed onto the core roller. The hollow roller forms the surface equipped with the molding cavities. The two-piece design of the roller makes it possible to replace the shaping elements on the roller. If it were desired, for example, to use the same device to produce shaped bodies having a different shape, it would not be necessary to replace the entire roller. The device can therefore be easily adapted to new shapes simply by replacing the hollow roller, which is possibly less expensive. Furthermore, due to the easy replaceability thereof, the hollow roller can be designed as a less expensive wearing part, unlike the core roller.

The shaping roller and/or the calibration roller and/or the deflection roller preferably comprise means for cooling. The cooling power can be improved by providing the cooled rollers, more particularly in that the cooling power can be adjusted in a defined manner at nearly every region of the device that comes in contact with hot cheese at least indirectly.

The invention is explained in greater detail in the following with reference to the figures.

Referring to FIG. 1, heated melted cheese 1 provided in the flowable state is fed via a supply nozzle 2 to the device. By way of a calibration roller 4, which is coated with Teflon in particular, and a shaping roller 5, individual shaped bodies 6 are produced that are carried via first, second and third cooling belts 3', 3" and 3'" to an output unit 18. During transport over the cooling belts 3, the shaped bodies are cooled and therefore transferred from their flowable state into a largely solid state.

A supply unit for supplying an auxiliary film 10 is provided in an upper region of the first cooling belt 3'. The flowable melted cheese 1 is applied onto this auxiliary film 10, which moves substantially at the same speed as the first cooling belt 3' and, for the rest, the other cooling belts 3", 3'" as well, and therefore lies indirectly on the first cooling belt 3'. The flowable melted cheese 1 is conveyed in the direction of a calibration roller 4 by the motion of the first cooling belt 3'. By changing the distance of the calibration roller 4 from the deflection roller 11 of the first cooling belt 3', band-shaped melted cheese 19 having a defined thickness is produced. The band-shaped melted cheese 19 is then fed by way of the motion of the first cooling belt 3' to a shaping roller 5, which is shown in greater detail in FIGS. 2A and 2B.

According thereto, the shaping roller 5 comprises a core roller 16 made of stainless steel and a hollow roller 17, which is also made largely of stainless steel, the surfaces of which are coated with Teflon, however. Alternatively, the hollow roller can also be a Teflon tube. A plurality of molding cavities 7 is distributed in a uniform arrangement around the circumference of the hollow roller. The molding cavities 7 are separated from one another by separating webs 8. The transition between the separating walls and the bases of the molding cavities can also be designed without a radius in each case. Viewed in cross section in FIG. 2B, the separating webs 8 have a cylindrical shape, which forms a remaining surface 12 of the shaping roller. This remaining surface 12 rolls indirectly off the first cooling belt 3'. The hollow roller 17 is removably mounted on the core roller 16 disposed coaxially thereto, thereby permitting other hollow rollers to be easily mounted onto the core roller if other shapes of the shaped bodies are desired.

The remaining surface 12 of the shaping roller 5 rolls substantially without sliding over the first cooling belt 3', and so the shaping roller 5 rotates substantially at the same speed (a 10% deviation in speed is quite possible) as the first cooling belt 3'. The shaping roller 5 is applied onto the first cooling belt 3' opposite the deflection roller 11 with pressure such that no cheese mass at all can remain between the separating webs 8 and the cooling belt 3'. The melted cheese remaining in the molding cavities 7 is therefore completely separated from the cheese in the other molding cavities. A single shaped body 6 is therefore accommodated in each of the molding cavities 7. In the present example, one of the deflection rollers 11 is the counterpressure roller against which the shaping roller 5 is applied; a separate counterpressure roller that does not perform a deflection function can also be used, however.

After the band-shaped melted cheese 19 has passed the shaping roller 5, the cheese is therefore no longer present as a continuous mass, but rather as separated shaped bodies 6, which are disposed between the two cooling belts 3', 3". A further film, namely an interlayer film 9, is disposed between the second cooling belt 3" and the shaped bodies 6, however, and is placed onto the second cooling belt 3" by way of a supply unit 15 and moves substantially at an identical speed with respect to the second cooling belt 3". In the region of the inlet gap 13, where the shaped bodies 6 become located between the first cooling belt 3' and the second cooling belt 3", the interlayer film 9 comes in contact with the shaped bodies 6. The interlayer film 9 is also a means for placing the shaped bodies 6 indirectly onto the second cooling belt 3". Accommodated between the two cooling belts 3' and 3", wherein both films 9 and 10 are disposed therebetween, the shaped bodies 6 pass through the vertical section formed between the first and second cooling belts 3', 3" to an outlet gap 14 at the lower end of this section. The product strand formed of the films 9, 10 and the shaped bodies 6 is then redirected over the lower deflection roller 11 of the first cooling belt 3', toward a third cooling belt 3'", which is disposed to the left next to the first cooling belt 3'. Here, the product strand comprising the films 9, 10 and the shaped bodies 6 is moved vertically upward, wherein further cooling takes place between the cooling belts. Subsequently the product strand is redirected over the top deflection roller 11 of the third cooling belt 3'" and is conveyed in the direction of the output unit 18. Before the output unit 18 is reached, the auxiliary film 10 is removed from the surface of the shaped bodies 6, and therefore only the interlayer film 9 is present between the shaped bodies 6 and the cooling belt 3'". The shaped bodies 6, including the interlayer film 9, are removed from the third cooling belt 3'" and are fed to the output unit 18. Subsequently, the shaped bodies 6 are separated from each other once and for all in that the interlayer film 9 is cut. The units comprising the interlayer film 9 and the shaped body 6 formed in this manner can then be fed to the further application. More particularly, such units can be stacked and then packaged.

The device according to the invention is characterized more particularly in that shaped bodies and, therefore, cheese slices, that deviate from an angular structure can be formed without waste. There are hardly any limits to the shaping. At the same time, the advantages of the vertical cooling path are utilized. Use is made of the fact that the shaped bodies are removed from the shaping roller already in the approximately uncooled state, thereby permitting easy removal from the shaping roller. The arrangement of cooling between the cooling belts results in uniform cooling of the shaped bodies, which can contribute to a uniform surface texture.

LIST OF REFERENCE SIGNS 1 melted cheese
2 supply nozzle
3 cooling belt
4 calibration roller
5 shaping roller
6 shaped body
7 molding cavity
8 separating web
9 interlayer film
10 auxiliary film
11 deflection roller
12 surface
13 inlet gap
14 outlet gap
15 device for supplying an interlayer film
16 core roller 17 hollow roller
18 output unit
19 band-shaped melted cheese

We claim:

1. A device for forming and cooling an initially hot and therefore flowable melted cheese (1) comprising:
   (a) a first metallic cooling belt (3') capable of moving in a downstream direction;
   (b) a counter-pressure roller (11) proximal to the first metallic cooling belt (3');
   (c) a rotatable shaping roller (5) disposed proximal to the first metallic cooling belt (3') upstream from the counter-pressure roller (11), wherein the rotatable shaping roller (5) comprises a number of molding cavities (7) formed in the surface, which are separated from one another by separating webs (8), wherein the separating webs (8) are formed by the remaining surface (12) of the rotatable shaping roller (5), wherein the rotatable shaping roller (5) is capable of applying a pressure by way of the separating webs (8) onto the cooling belt (3') that results in displacement of the still-hot melted cheese (1) from a region of the separating webs (8) lying thereupon, so that shaped bodies (6) of melted cheese (1) released from the molding cavities (7) remain on the first metallic cooling belt (3') for cooling.

2. The device according to claim 1, wherein the device comprises a second metallic cooling belt (3") mounted on the counter-pressure roller (11), which is capable of moving at the same speed as the first cooling belt (3') and which is capable of covering shaped bodies (6) lying on the first cooling belt (3').

3. The device according to claim 2, wherein the first metallic cooling belt (3') and the second metallic cooling belt (3") of the device are endless steel belts, wherein the first metallic cooling belt (3') runs over a first deflection roller (11") adjacent to the counter-pressure roller (11) and a second deflection roller (11''') below the first deflection roller (11") and the second metallic cooling belt (3") runs over the counter-pressure roller (11) and a third deflection roller (11'), wherein the first cooling belt (3') and the second cooling belt (3") are arranged such that the first metallic cooling belt (3') is adjacent, and parallel, to the second metallic cooling belt (3") to form an inlet gap (13) adjacent to the counter-pressure roller and an outlet gap (14) downstream from the inlet gap (13).

4. The device according to claim 1, wherein the device comprises a feeder (15) for feeding a plastic interlayer film (9) into the inlet gap (13).

5. The device according to claim 1, wherein the device further comprises a calibration roller (4), which is disposed upstream from the shaping roller (5) and which is capable of bringing about a rolling-out of the hot melted cheese (1) into a cheese band having a specifiable thickness.

6. The device according to claim 1, wherein the shaping roller (5) is suitable for forming shaped bodies having regions having different thicknesses.

7. The device according to claim 5, wherein the shaping roller (5) is suitable for forming shaped bodies having regions having different thicknesses.

8. The device according to claim 1, wherein the shaping roller (5) is capable of applying a pressure by way of the separating webs (8) onto the cooling belt (3') that results in full displacement of the still-hot melted cheese (1) from a region of the separating webs (8) lying thereupon.

9. The device according to claim 1, wherein the surface (12) of the shaping roller (5) equipped with the molding cavities (7) is made of plastic.

10. The device according to claim 1, wherein the shaping roller (5) comprises a core roller (16) and a hollow roller (17) detachably placed onto the core roller, wherein the hollow roller has the surface (12) equipped with the molding cavities (7).

11. The device according to claim 1, wherein the shaping roller (5) is adapted for cooling.

12. The device according to claim 3, wherein at least one of the deflection rollers (11) is adapted for cooling.

13. The device according to claim 5, wherein the calibration roller (4) is adapted for cooling.

14. The device according to claim 1, wherein the device further comprises a supply nozzle (2) of applying melted cheese (1) onto the first metallic cooling belt (3') upstream from the counter-pressure roller (11).

* * * * *

UNITED STATES PATENT AND TRADEMARK OFFICE
CERTIFICATE OF CORRECTION

PATENT NO. : 10,349,620 B2  
APPLICATION NO. : 15/363179  
DATED : July 16, 2019  
INVENTOR(S) : Zeuschner et al.

Page 1 of 1

It is certified that error appears in the above-identified patent and that said Letters Patent is hereby corrected as shown below:

In the Specification

Column 5, Detailed Description of the Invention, Line 19, Delete "3", 3"" and insert --3", 3'"-- therefor In the Claims Column 8, Line 38, In Claim 14, before "of", insert --capable--

Signed and Sealed this  
Twenty-fifth Day of August, 2020

Andrei Iancu  
*Director of the United States Patent and Trademark Office*